US007861250B2

(12) United States Patent
Messec et al.

(10) Patent No.: US 7,861,250 B2
(45) Date of Patent: Dec. 28, 2010

(54) RUNTIME POLYMORPHISM

(75) Inventors: John A. Messec, Seattle, WA (US); Jonathan M. Rowlett, Sammamish, WA (US); Jeffrey P. Snover, Woodinville, WA (US); Daniel T. Travison, Jr., Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1290 days.

(21) Appl. No.: 10/423,349

(22) Filed: Apr. 25, 2003

(65) Prior Publication Data

US 2004/0216132 A1 Oct. 28, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/316; 717/103; 717/108

(58) Field of Classification Search ......... 717/100–167; 719/310–320, 328–330
See application file for complete search history.

(56) References Cited

U.S. PATENT DOCUMENTS

| 5,721,925 | A | 2/1998 | Cheng et al. |
| 5,978,579 | A | 11/1999 | Buxton et al. |
| 6,134,559 | A * | 10/2000 | Brumme et al. ......... 707/103 R |
| 6,138,269 | A | 10/2000 | Ball et al. |
| 6,275,979 | B1 | 8/2001 | Graser et al. |
| 6,378,003 | B1 | 4/2002 | Danforth |
| 6,405,363 | B1 | 6/2002 | Carlson et al. |
| 6,983,448 | B2 * | 1/2006 | Hartel et al. ................ 717/116 |
| 6,999,956 | B2 * | 2/2006 | Mullins ...................... 707/2 |
| 7,516,439 | B2 * | 4/2009 | Robinson ................... 717/103 |
| 2002/0035569 | A1 | 3/2002 | Clark et al. |
| 2002/0199034 | A1 * | 12/2002 | Beckett et al. ............. 709/328 |
| 2003/0005169 | A1 * | 1/2003 | Perks et al. ................ 709/315 |

(Continued)

FOREIGN PATENT DOCUMENTS

EP       1041485        10/2000

(Continued)

OTHER PUBLICATIONS

Rosen et al, Integrating CORBA and COM Applications, 1998, John Wiley & Sons; Inc., pp. 67-81.*

(Continued)

*Primary Examiner*—Diem K Cao
(74) *Attorney, Agent, or Firm*—Lee & Hayes, PLLC

(57) ABSTRACT

Runtime polymorphism may be enabled with metadata that is usable for casting objects to casted objects. In an exemplary media implementation, processor-executable instructions cause operations including: discover at least one type of an object while in a runtime environment; and create a casted object from the object by casting the object to the casted object using metadata. An exemplary computing device implementation includes: one or more processors; and one or more media in operative communication therewith, the one or more media including: an object of a first type; metadata that is capable of being used to cast unknown objects in a runtime environment; and processor-executable instructions that, when executed, cause the one or more processors to perform an action including: casting the object of the first type to a casted object of a second type using the metadata in the runtime environment, the first type differing from the second type.

10 Claims, 10 Drawing Sheets

U.S. PATENT DOCUMENTS

| | | | |
|---|---|---|---|
| 2004/0044755 A1* | 3/2004 | Chipman | 709/223 |
| 2004/0064825 A1* | 4/2004 | Lim et al. | 719/319 |
| 2005/0149555 A1* | 7/2005 | Wang et al. | 707/103 R |
| 2006/0020602 A9* | 1/2006 | Morgan et al. | 707/100 |
| 2007/0220022 A1* | 9/2007 | Lankinen et al. | 707/101 |

FOREIGN PATENT DOCUMENTS

| | | |
|---|---|---|
| WO | WO02052430 | 7/2002 |
| WO | WO02052730 A1 | 7/2002 |
| WO | WO02101579 | 12/2002 |

OTHER PUBLICATIONS

Smith et al, A Case for Meta-Interworking: Projecting CORBA Metadata into COM, IEEE, 1998, pp. 242-253.*

Ban, Extending CORBA for Multi-Domain Management, IBM, Aug. 1996, pp. 1-12.*

Gutknecht, Active Oberon for .NET: An Exercise in Object Model Mapping, Elsevier Science B.V., 2001, pp. 1-19.*

Meijer et al, Technical Overview of the Common Language Runtime, Jun. 2001, pp. 1-16.*

Abdelmadjid Ketfi et al., "Adapting applications on the fly," Proceedings ASE 2002, 17th IEEE International Conference on Automated Software Engineering, 2002, p. 313.

Andrew Kennedy et al., "Design and Implementation of Generics for the .NET Common Language Runtime," ACM SigPlan Notices, 2001, V 36, N5 (May), pp. 1-12.

Georg Gottlob et al., "Extending Object-Oriented Systems with Roles," ACM Transactions on Information Systems, vol. 14, No. 3, Jul. 1996, pp. 268-296.

Stephanie Weirich, "Type-Safe Cast—Functional Pearl," ACM SigPlan Notices, 2000, V 35, N9 (Sep.), pp. 58-67.

Mirko Viroli et al., "Parametric Polymorphism in Java: an Approach to Translation Based on Reflective Features," ACM SigPlan Notices, 2000, V35, N10 (Oct.), pp. 146-165.

EPO Communication with Search Report dated Jul. 18, 2006, from counterpart EP patent application, European Patent Application No. 04 009 695.0, copy attached, 5 pages.

Chinese Office Action dated Dec. 8, 2006, from counterpart CN patent application, Chinese Patent Application No. 200410043402.6, copy attached, 3 pages.

Iwayama, Noboru, "Techniques of Utilizing C ++ Builder, (5), Special Classes", Inside Windows, vol. 4, No. 2, pp. 62-67, Softbank Corp., Japan, Feb. 1, 1998.

Kungi, Yasumichi, "Introduction to ++ Programing (2), Mechanism of Inheritance and Virtual Function", Col. 19, No. 8, pp. 199-210, CQ Publishing co., Ltd., Japan, Aug. 1, 1993.

Notice of Rejection from Japanese Patent Office for Application No. 2004-130331, mailed on Sep. 4, 2009, 14 pages.

* cited by examiner

RUNTIME POLYMORPHISM

TECHNICAL FIELD

This disclosure relates in general to runtime polymorphism and in particular, by way of example but not limitation, to implementing polymorphism in a runtime environment by casting a first object to a second object using metadata.

BACKGROUND

The traditional functional-oriented approach to programming has largely been superseded by the object-oriented programming paradigm. With functional-oriented programming, code is organized around actions and written based primarily on logic. With object-oriented programming, code is organized around "objects" and written responsive primarily to the underlying data.

Object-oriented programming provides many conceptual advances and code-related benefits such as reusability, adaptability, modularity, and so forth. These benefits arise, at least partly, from the fundamental tenets of object-oriented programming and the principles that flow therefrom. For example, object-oriented programming usually adheres to encapsulation, inheritance, and polymorphism.

Encapsulation relates to the ability and tendency of an object to protect its data by limiting access to its data from external sources. A given object can stipulate which of its data are exposed and can constrain if not fully control how its data may be manipulated.

Inheritance enables characteristics of one class of objects to be extended to another class. For example, each sub-class of a super-class inherits all of the characteristics of that super-class. Furthermore, a programmer may specify which additional characteristics are to be newly included for each inheriting sub-class. A resulting set of inheritance relationships is carefully crafted by the compiler at compile time. A hierarchical framework that facilitates extensions of existing classes is thereby enabled with inheritance.

Polymorphism may refer, at least partly, to an ability of an object to react differently to different stimulus. In other words, polymorphism may pertain to being able to assign a different usage or meaning to the same information in different contexts. More specifically, traditional polymorphism enables the programmed procedures of super-classes to be redefined for their corresponding sub-classes. However, this redefining ability is limited. Such redefinitions for the programmed procedures are fixed at compile time. In fact, a programmer or designer establishes the potential polymorphism based on expectations and/or predictions for the likely inputs of the programmed procedures.

Furthermore, traditional polymorphism is based solely on the overall types of the super-class and any sub-classes thereof. Those types are usually related such that sub-classes can be cast to their super-class(es). Traditional polymorphism is therefore contingent on the destination type being predefined to allow casting from a particular source type.

Accordingly, there is a need for a polymorphism paradigm for objects that provides increased predictability, flexibility, and/or versatility.

SUMMARY

Runtime polymorphism may be enabled with metadata that is usable for casting objects to casted objects. In an exemplary media implementation, processor-executable instructions thereof direct a computing device to execute operations including: discover at least one type of an object while in a runtime environment; and create a casted object from the object by casting the object to the casted object using metadata. An exemplary computing device implementation includes: one or more processors; and one or more media in operative communication with the one or more processors, the one or more media including: an object of a first type; metadata that is capable of being used to cast unknown objects in a runtime environment; and processor-executable instructions that, when executed, cause the one or more processors to perform an action including: casting the object of the first type to a casted object of a second type using the metadata in the runtime environment, the first type differing from the second type.

Other method, system, apparatus, media, arrangement, apparatus, device, etc. implementations are described herein.

BRIEF DESCRIPTION OF THE DRAWINGS

The same numbers are used throughout the drawings to reference like and/or corresponding aspects, features, and components.

DETAILED DESCRIPTION

In a described implementation, runtime polymorphism enables objects of arbitrary types to be casted using an enhanced polymorphism scheme into a new type at runtime using a metadata description of the process. Instead of having polymorphism being defined at compile time, at least one implementation described below defines polymorphism in the metadata that is interpreted at runtime.

Instead of polymorphing objects solely based on type, at least one implementation described below enhances polymorphism by including references to the features of the source object. For example, the metadata may describe a property on the source object with a specific name without regard to its type. Furthermore, instead of having both the source type information and the destination type information being fully defined at compile time, at least one implementation described below for runtime polymorphism enables unknown source types such that source type information is discovered at runtime.

Also, instead of relying on one-to-one casting in which a specific type is polymorphed to another specific type with a unique destination type for each unique source type, at least one implementation described below handles polymorphism of multiple arbitrary source types to a destination type with the same runtime casting definition being used for any source type to enable many-to-one casting. Thus, multiple source objects may be polymorphed into a single destination object. Moreover, at least one implementation described below is flexible at runtime such that a destination type is generated regardless of the source type that is discovered at runtime.

Figure 1:
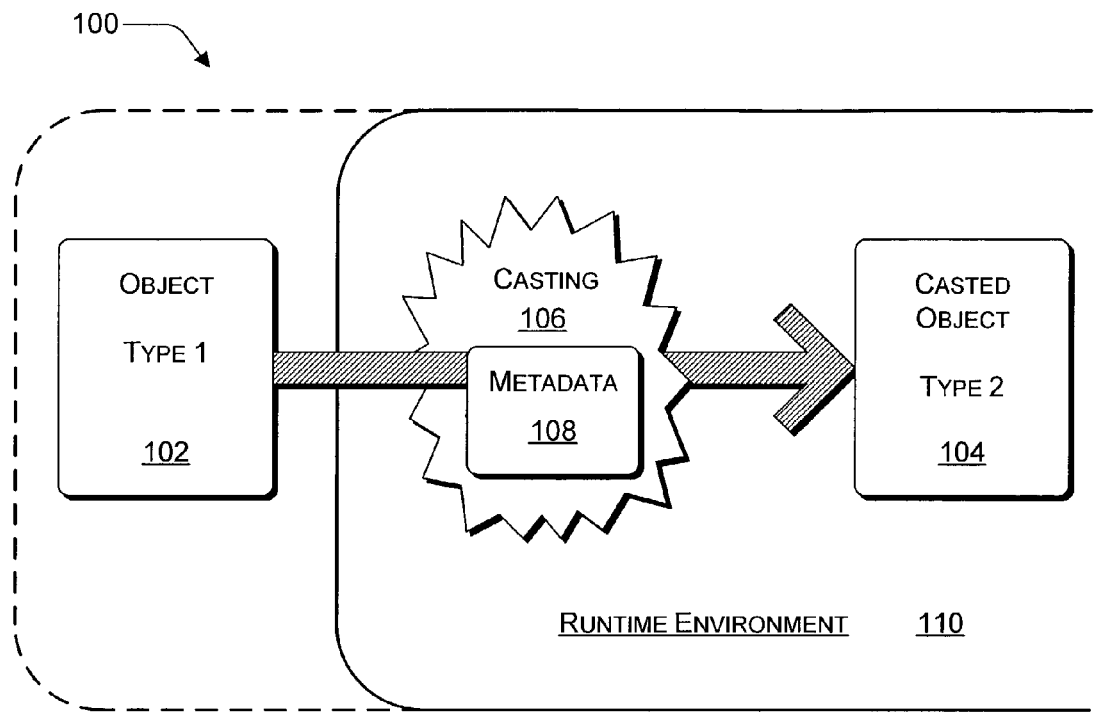
FIG. 1 is a block diagram that illustrates a first exemplary approach to runtime polymorphism.

FIG. 1 is a block diagram 100 that illustrates a first exemplary approach to runtime polymorphism. In a described implementation, block diagram 100 includes a runtime environment (RTE) 110 that is demarcated by solid lines. An object 102 is of a first type, such as a first class type (e.g., "Type 1"). As indicated by the dashed lines extending from the solid lines of runtime environment 110, object 102 may be defined within runtime environment 110 or outside of runtime environment 110, such as prior to initialization of runtime environment 110.

As illustrated, runtime environment 110 includes a casted object 104 that is of a second type, such as a second class type (e.g., "Type 2"). Runtime environment 110 also includes a casting process 106 and metadata 108. While in runtime environment 110, object 102 of the first type is polymorphed into casted object 104 of the second type via casting process 106 using metadata 108. For example, casting process 106 involves interpreting the metadata description 108 for the creation of casted object 104 from object 102.

Figure 2:
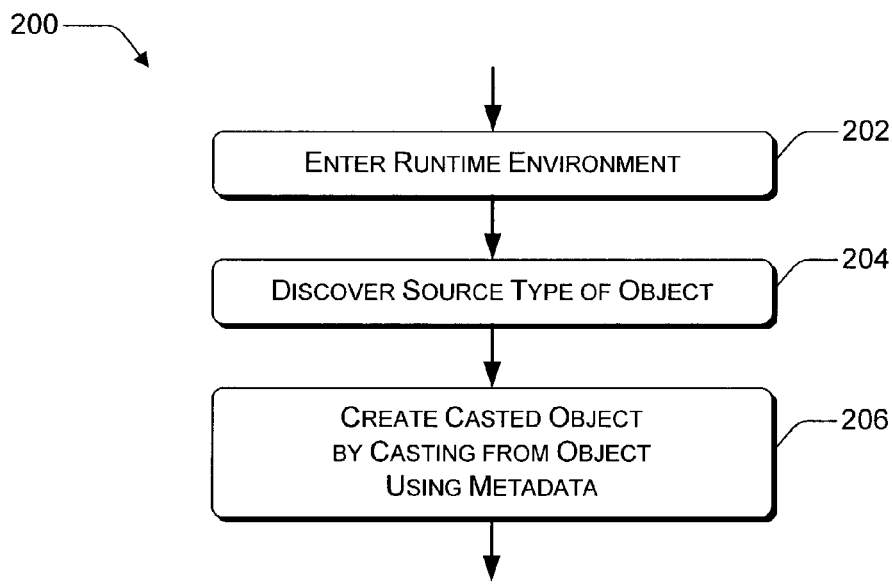
FIG. 2 is a flow diagram that illustrates a first exemplary method for runtime polymorphism.

FIG. 2 is a flow diagram 200 that illustrates a first exemplary method for runtime polymorphism. Flow diagram 200 includes three (3) blocks 202-206. At block 202, a runtime environment is entered. For example, runtime environment 110 (of FIG. 1) may be initiated (or already existing). At block 204, a source type for an object is discovered. For example, the class type or similar of object 102 may be discovered by examining object 102 from within runtime environment 110.

At block 206, a casted object is created by casting it from the object using metadata. For example, object 102 may be casted to casted object 104 using metadata 108. In other words, while in runtime environment 110, coding may cast object 102 to casted object 104. Furthermore, while maintaining runtime environment 110, metadata 108 may be modified, for example in accordance with an application or responsive to user interface input. This modified metadata may also be used in a casting process 106 to create casted objects 104 (of a third type) from object 102 (of the first type) or from other objects.

Employing polymorphism can enable the use of one type as another type. In an exemplary described implementation, metadata for runtime polymorphism defines additional casting functions or mappings to permit the cast of a type based on individual features of the type and not necessarily the type in a holistic sense. As a consequence, various types may themselves be defined at different times without specific knowledge of other types at compile time while still being cast back (and optionally forth) at runtime. The individual features of a type or types that may be targeted for casting are, for example, the names and types of properties included on a source object and the names and signatures of methods included on the source object.

In a described implementation, four exemplary casting operations may be used for mapping features between source object(s) and destination object(s):

(1) 1-to-1 Mapping of Methods and Properties.

This casting operation can define a mapping from a source property or method with a particular name to a destination property or method with a particular name. The properties can have the same type or different types, especially if those types can be coerced back and forth. Also, method calls on the source object can be exposed as properties on the destination object and vice versa.

(2) 1-to-None Mapping of Methods and Properties.

This casting operation can map a source property or method to nothing in the destination object. In other words, the source property or method is not available on the destination object.

(3) Many-to-1 Mapping of Methods and Properties.

This casting operation enables a programmer or other user to define the value of a destination property or method as a function of one or more source properties and/or method calls. This function can be one way from source object to destination object, or it can be bi-directional. With a bi-directional mapping, a property or method on the destination object can be set, and it is automatically set likewise on the source object. As in (1) above, method calls on the source object can be exposed as properties on the destination object and vice versa.

(4) New Methods and Properties.

This casting operation enables a new property or method to be defined on the destination object that is not a feature or function of the source object. The resulting properties on the destination object may be considered "expando" properties.

Figure 3:
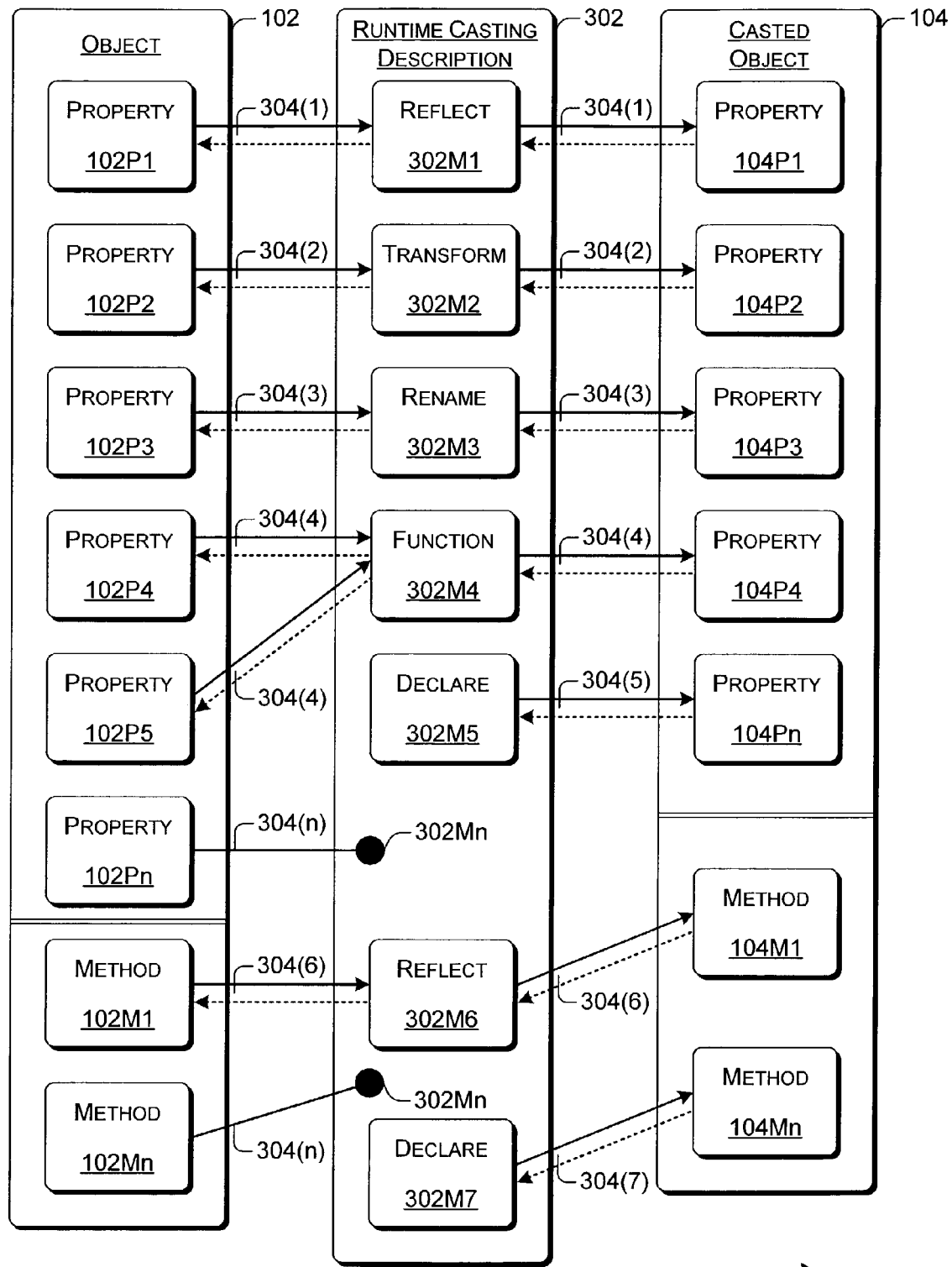
FIG. 3 is a block diagram that illustrates a second exemplary approach to runtime polymorphism.

FIG. 3 is a block diagram 300 that illustrates a second exemplary approach to runtime polymorphism. Block diagram 300 includes object 102, casted object 104, and a runtime casting description 302. Runtime casting description 302 is an example of metadata 108 (of FIG. 1). Object 102 and casted object 104 may each include or otherwise be associated with at least one feature, such as a method or a property. In a described implementation, a property is data that is owned by an object and is identified by a name therefor, and a method is a code routine that is owned by the object.

More specifically, object 102 and casted object 104 may each have one or more properties and/or one or more methods. As illustrated, object 102 includes multiple properties 102P1, 102P2, 102P3, 102P4, 102P5 . . . 102Pn as well as multiple methods 102M1 . . . 102Mn. Casted object 104 includes multiple properties 104P1, 104P2, 104P3, 104P4 . . . 104Pn as well as multiple methods 104M1 . . . 104Mn.

In a described implementation, runtime casting description 302 includes one or more mapping descriptions 302M. As illustrated, runtime casting description 302 includes at least seven (7) exemplary mapping descriptions 302M: a (property) reflection mapping description 302M1, a transformation mapping description 302M2, a renaming mapping description 302M3, a function mapping description 302M4, a (property) declaration mapping description 302M5, a (method) reflection mapping description 302M6, and a (method) declaration mapping description 302M7.

Runtime casting description 302 may also explicitly or implicitly include a filter mapping description 302Mn. In an implicit filter mapping description 302Mn for example, runtime casting description 302 may omit any reference to actual or potential features (of an object 102) that are not to be cast (to a casted object 104). In an explicit filter mapping description 302Mn for example, runtime casting description 302 may affirmatively indicate that specific enumerated features and/or general unspecified features (of an object 102) are not be cast (to a casted object 104).

Each of the seven mapping descriptions 302M1 . . . 302M7 corresponds to a respective mapping or feature casting operation 304(1) . . . 304(7). Specifically, block diagram 300 illustrates seven (7) exemplary corresponding mappings 304 as follows: a (property) reflection mapping 304(1), a transformation mapping 304(2), a renaming mapping 304(3), a function mapping 304(4), a (property) declaration mapping 304(5), a (method) reflection mapping 304(6), and a (method) declaration mapping 304(7). A filtering mapping 304(n) for either or both of property and method features is also implementable by runtime casting description 302.

One or more of mapping descriptions 302M may therefore be used in a casting operation to cast object 102 to casted object 104. Each individual feature casting operation 304 is represented by a solid arrow and a dashed arrow. The solid arrow indicates a connection from object 102 to casted object 104, and the dashed arrow indicates a "backward" connection from casted object 104 to object 102. This runtime binding aspect is described further below.

Individual feature casting operations 304 may be effectuated as follows. Reflection mapping 304(1) directly reflects property 102P1 into property 104P1. Transformation mapping 304(2) transforms one or more attributes such as read, write, type, etc. of property 102P2 for property 104P2. Rename mapping 304(3) renames property 102P3 as property 104P3.

Function mapping 304(4) casts property 104P4 of casted object 104 as a function of at least one property of object 102. As illustrated, property 104P4 is a function of property 102P4 and property 102P5 in accordance with function mapping description 302M4. For declaration mapping 304(5), property 104Pn is newly declared for casted object 104 as an extension to and/or from object 102. With respect to filter mapping 304(n) and property 102Pn of object 102, property 102Pn is filtered as a result of interpreting runtime casting description 302 such that no property corresponding thereto is cast for casted object 104.

Reflection mapping 304(6) directly reflects method 102M1 into method 104M1. For declaration mapping 304(7), method 104Mn is newly declared for casted object 104 as an extension to and/or from object 102 in accordance with declaration mapping description 302M7. With respect to filter mapping 304(n) and method 102Mn of object 102, method 102Mn is filtered as a result of interpreting runtime casting description 302 such that no method corresponding thereto is include in casted object 104.

Block diagram 300 illustrates an exemplary casting operation that creates casted object 104 from object 102. As noted above, this casting operation is capable of maintaining a backwards connection from casted object 104 to object 102 as indicated by the dashed arrows. The connection between object 102 and casted object 104 may therefore be considered to have a forward aspect and a backward aspect. The forward connection aspect, as represented by the solid arrows, establishes a relationship between object 102 and casted object 104. The backward connection aspect, as represented by the dashed arrows, establishes a runtime binding between object 102 and casted object 104. Separately and/or in conjunction with one another, the forward and backward connections facilitate a runtime binding of (i) object 102 to casted object 104 and (ii) casted object 104 to object 102.

It should be noted that each individual feature casting operation 304 may not have a related backward connection. For example, a backward connection for property declaration mapping 304(5) and method declaration mapping 304(7) may be irrelevant. As another example, it may be difficult or impossible to institute a backward connection for a particular function mapping 304(4).

In a described implementation, runtime casting description 302 may attempt to cast a destination feature for casted object 104 for which there is no corresponding source feature in object 102 as expected by the particular mapping description 302M. For example, a transformation mapping description 302M2 expects to locate a predetermined property 102P2 for casting to property 104P2. However, when operating in a runtime environment 110, no such expected predetermined feature may be present in object 102. For such possibilities and/or eventualities, one or more (including all) mapping descriptions 302M that are defined to expect to locate a predetermined feature in a source object may include one or more default parameters for use in creating a casted feature for the destination object when the source object lacks the expected predetermined feature.

Figure 4:
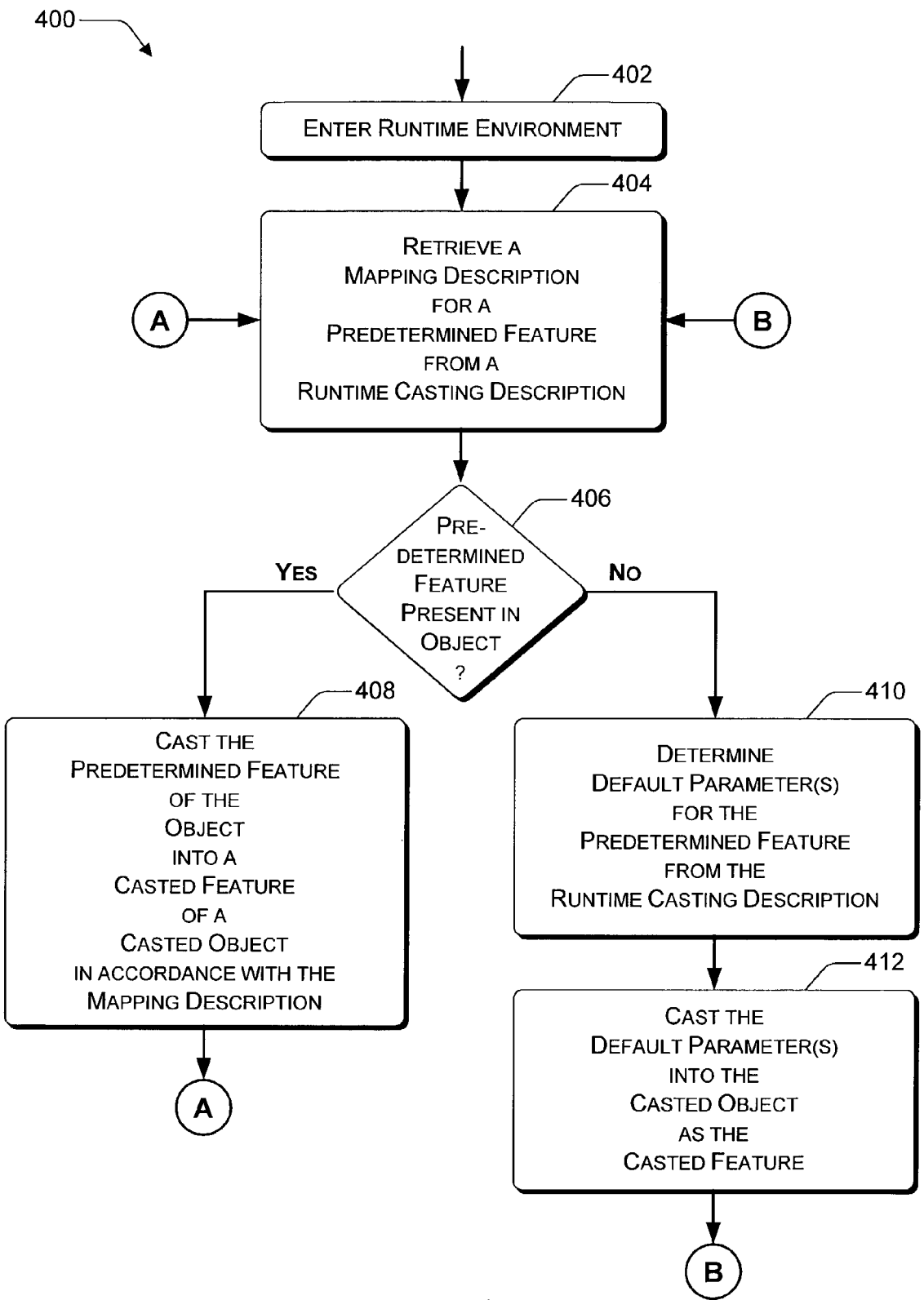
FIG. 4 is a flow diagram that illustrates a second exemplary method for runtime polymorphism.

FIG. 4 is a flow diagram 400 that illustrates a second exemplary method for runtime polymorphism. Flow diagram 400 includes six (6) blocks 402-412. Flow diagram 400 addresses a described implementation in which an expected predetermined feature may not be retrievable from a source object during a casting operation.

At block 402, a runtime environment is entered. For example, a runtime environment 110 (of FIG. 1) may be initiated (or already existing) in a code-processing computing device. At block 404, a mapping description for a predetermined feature of an object is retrieved from a runtime casting description. For example, a particular mapping description 302M (of FIG. 3) for a predetermined feature (e.g., a property 102P or a method 102M) of an object 102 may be retrieved from a runtime casting description 302.

At block 406, it is ascertained whether the predetermined feature is present in the object. For example, the features 102P and 102M of object 102 are inspected to ascertain whether the predetermined feature that is expected by the particular mapping description 302M is present within object 102. If so, the predetermined feature of the object is cast into a casted object as a casted feature in accordance with the mapping description at block 408. For example, the expected predetermined feature 102P or 102M of object 102 is cast into casted object 104 as a casted feature 104P or 104M in accordance with the particular mapping description 302M.

If, on the other hand, it is ascertained at block 406 that the expected predetermined feature is not present in the object, then default parameter(s) for the predetermined feature (and/or the casted feature) are determined from the runtime casting description at block 410. Such default parameter(s) may be specifically part of the mapping description or generally part of the runtime casting description. For example, the overall runtime casting description 302 and/or the particular mapping description 302M may be consulted to determine default parameter(s) for the expected predetermined feature 102P or 102M of object 102 (and/or the would-be casted feature 104P or 104M of casted object 104).

At block 412, the default parameter(s) are cast into the casted object as the casted feature in accordance with the mapping description. For example, the default parameter(s) may be cast into a casted feature 104P or 104M of object 104 by applying the dictates of the particular mapping description 302M and/or by placing the default parameter(s) directly into the casted feature 104P or 104M without modification. As indicated by the encircled "A"s and "B"s, after the action(s) of either of blocks 408 and 412 have been performed, flow can continue at block 404 to process another mapping description of the runtime casting description.

Figure 5A:
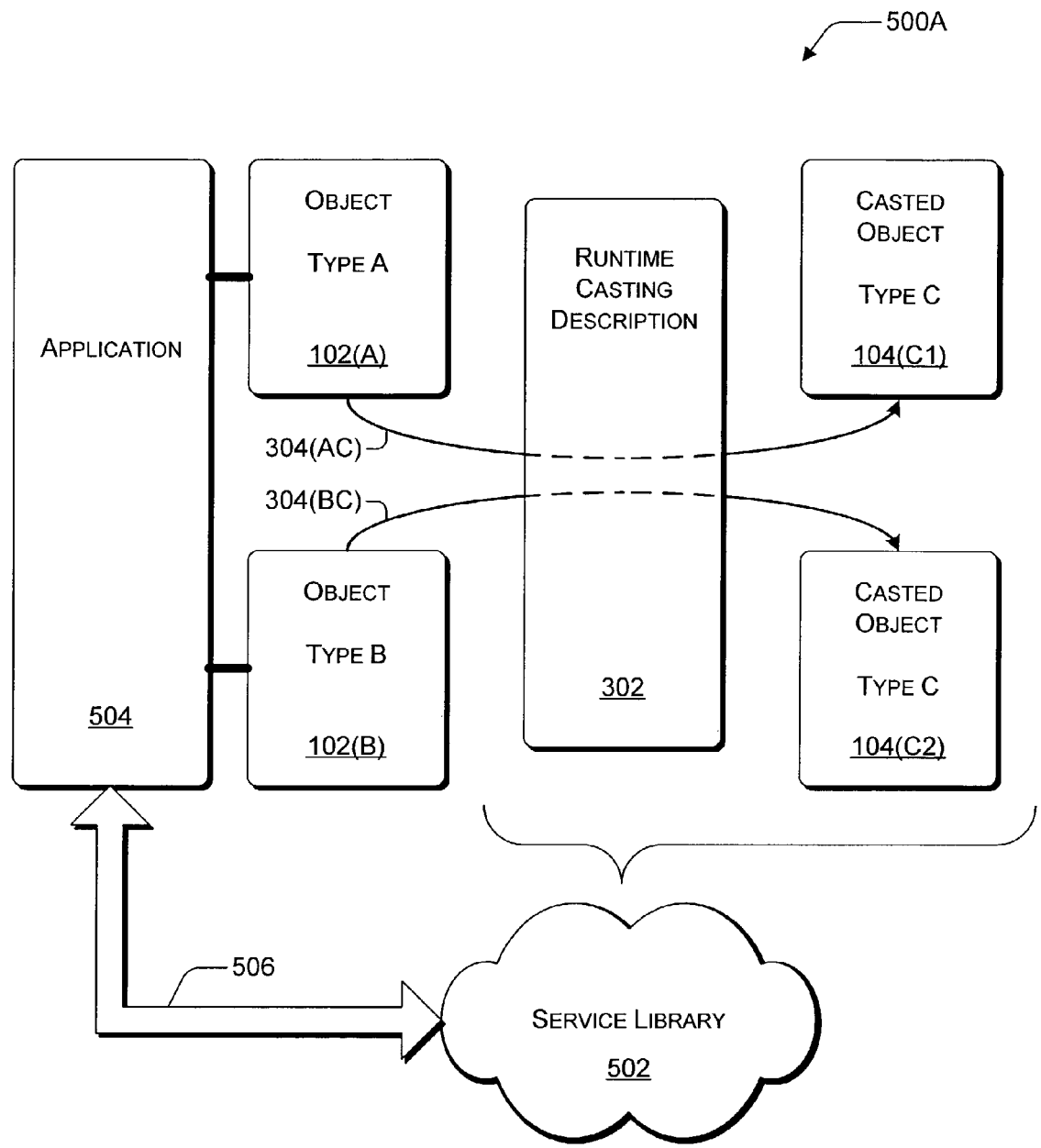
FIGS. 5A and 5B are block diagrams that illustrate third and fourth exemplary approaches, respectively, to runtime polymorphism.

FIG. 5A is a block diagram 500A that illustrates a third exemplary approach to runtime polymorphism. Block diagram 500A includes two applications 502 and 504; a runtime casting description 302; and four objects 102(A), 102(B), 104(C1), and 104(C2). As illustrated for a described implementation, applications 502 and 504 represent a generic application 504 and a (reusable) service library 502, which may optionally be part of an operating system.

Service library 502 and application 504 can communicate between each other using link 506 via messages or a similar mechanism. Application 504 includes or is otherwise associated with two objects: object 102(A) of a type "A" and object 102(B) of a type "B", where type A differs from type B. In this example, application 504 requests that service library 502 perform a runtime casting operation to create two objects that have the same type from object 102(A) and object 102(B). It should be noted that application 504 may alternatively perform the runtime casting operation without calling on any other application.

Service library 502 orchestrates the requested runtime casting operation using a runtime casting description 302. Runtime casting description 302 may be provided by application 504, by service library 502, by an operating system (not specifically illustrated in FIG. 5A), by another application, and so forth. Casted object 104(C1) of a type "C" is created from object 102(A) in a casting operation 304(AC) by interpreting runtime casting description 302 in a runtime environment 110. Similarly, casted object 104(C2) also of a type "C" is created from object 102(B) in a casting operation 304(BC) by interpreting runtime casting description 302 in runtime environment 110.

Thus, object 102(A) and object 102(B) of two different types A and B are cast to object 104(C1) and object 104(C2), respectively, of the same type C. Furthermore, object 102(A) and object 102(B) need not be derived from the same base class. This casting of objects of different types to objects of the same type may be accomplished, at least in part, by filtering features that are not in common using filter mapping description(s) 302Mn, by using declaration mapping description(s) 302M5 and/or 302M7, and/or by relying on default parameter(s) when expected predetermined features as stipulated in a runtime casting description 302 are not located in a source object. It should be understood that other mapping descriptions 302M may also be implemented for casting objects of different types to objects of the same type.

Figure 6A:
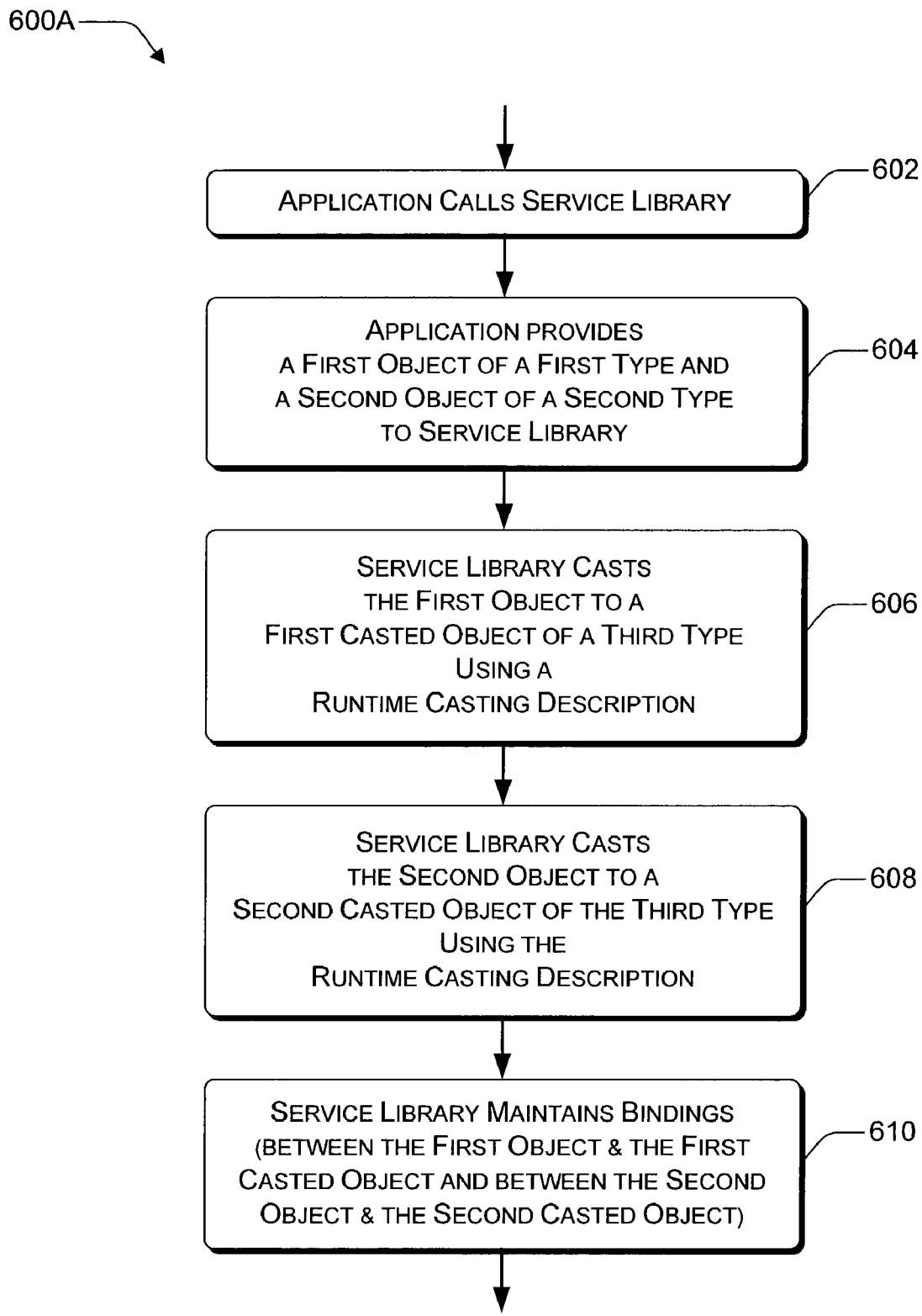
FIGS. 6A and 6B are flow diagrams that illustrate third and fourth exemplary methods, respectively, for runtime polymorphism.

FIG. 6A is a flow diagram 600A that illustrates a third exemplary method for runtime polymorphism. Flow diagram 600A includes five (5) blocks 602-610. At block 602, an application calls a service library component. For example, application 504 (of FIG. 5A) may call service library 502. At block 604, the application provides a first object of a first type and a second object of a second type to the service library. For example, application 504 may use a link 506 to provide to service library 502 (directly, by pointer reference, etc.) an object 102(A) of a type A and an object 102(B) of a type B.

At block 606, the service library casts the first object to a first casted object of a third type using a runtime casting description. For example, service library 502 may cast object 102(A) in a casting operation 304(AC) to a casted object 104(C1) of a type C using a runtime casting description 302. At block 608, the service library casts the second object to a second casted object of the third type using the runtime casting description. For example, service library 502 may cast object 102(B) in a casting operation 304(BC) to a casted object 104(C2) of the type C using runtime casting description 302.

At block 610, the service library maintains the bindings established by the casting operations. These bindings are between the first object and the first casted object and between the second object and the second casted object. The bindings may be maintained until the first casted object and/or the second casted object are terminated. By way of example, service library 502 may maintain bindings between object 102(A) and casted object 104(C1) and between object 102(B) and casted object 104(C2). Alternatively, application 504 or other code may maintain the bindings between objects 102(A) and 102(B) and casted objects 104(C1) and 104(C2), respectively. Regardless, the bindings may be maintained without further reference to runtime casting description 302.

Figure 5B:
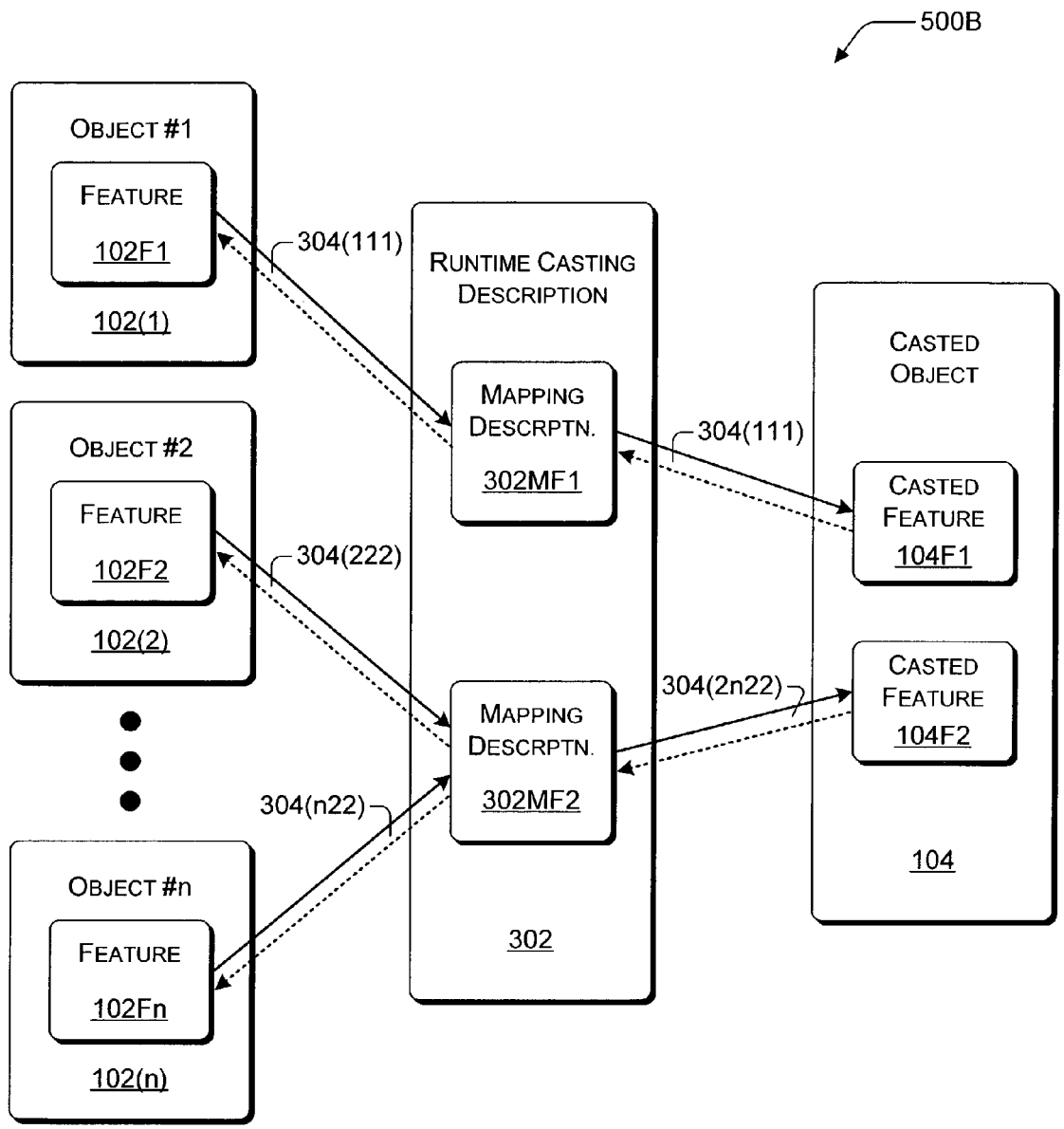

FIG. 5B is a block diagram 500B that illustrates a fourth exemplary approach to runtime polymorphism. Block diagram 500B includes multiple objects 102(1, 2 . . . n), a runtime casting description 302, and a casted object 104. As illustrated, an object #1 102(1), an object #2 102(2), and an object #n 102(n) are involved in a casting operation to create casted object 104 using runtime casting description 302. Thus, two or more objects 102(1, 2 . . . n) may be cast to casted object 104 using runtime casting description 302.

In a described implementation, casted object 104 is created from multiple objects 102(1, 2 . . . n) using one or more feature mapping descriptions 302MF of runtime casting description 302. Runtime casting description 302 includes mapping description 302MF1 and mapping description 302MF2. Each of the multiple objects 102(1, 2 . . . n) includes at least one feature 102F(1, 2 . . . n), such as a source feature. Casted object 104, as illustrated in block diagram 500B, includes at least two casted features 104F(1, 2), such as destination features. Mapping description 302MF1 maps one feature from one object to one casted feature of the casted object with feature mapping 304(111). Specifically, feature casting operation 304(111) casts feature 102F1 of object #1 102(1) to casted feature 104F1 of casted object 104. Mapping description 302MF2 maps multiple features from multiple (different) objects to one casted feature of the casted object with feature mapping 304(222)/304(n22)/304(2n22). Specifically, feature casting operation 304(222)/304(n22)/304(2n22) casts feature 102F2 of object #2 102(2) and feature 102Fn of object #n 102(n) to casted feature 104F2 of casted object 104.

Although so illustrated in FIG. 5B, it should be understood that both feature mapping 304(111) and feature mapping 304(222)/304(n22)/304(2n22) need not necessarily occur in any single casting operation. Furthermore, with reference to the description below for FIGS. 7 and 8 in an exemplary implementation, object #1 102(1) may correspond to a string table object, object #2 102(2) may correspond to an image object, and object #3 102(3) (where n=3) may correspond to a file object. It should be noted that in such an exemplary implementation different mapping descriptions 302MF may be included in runtime casting description 302.

Figure 6B:
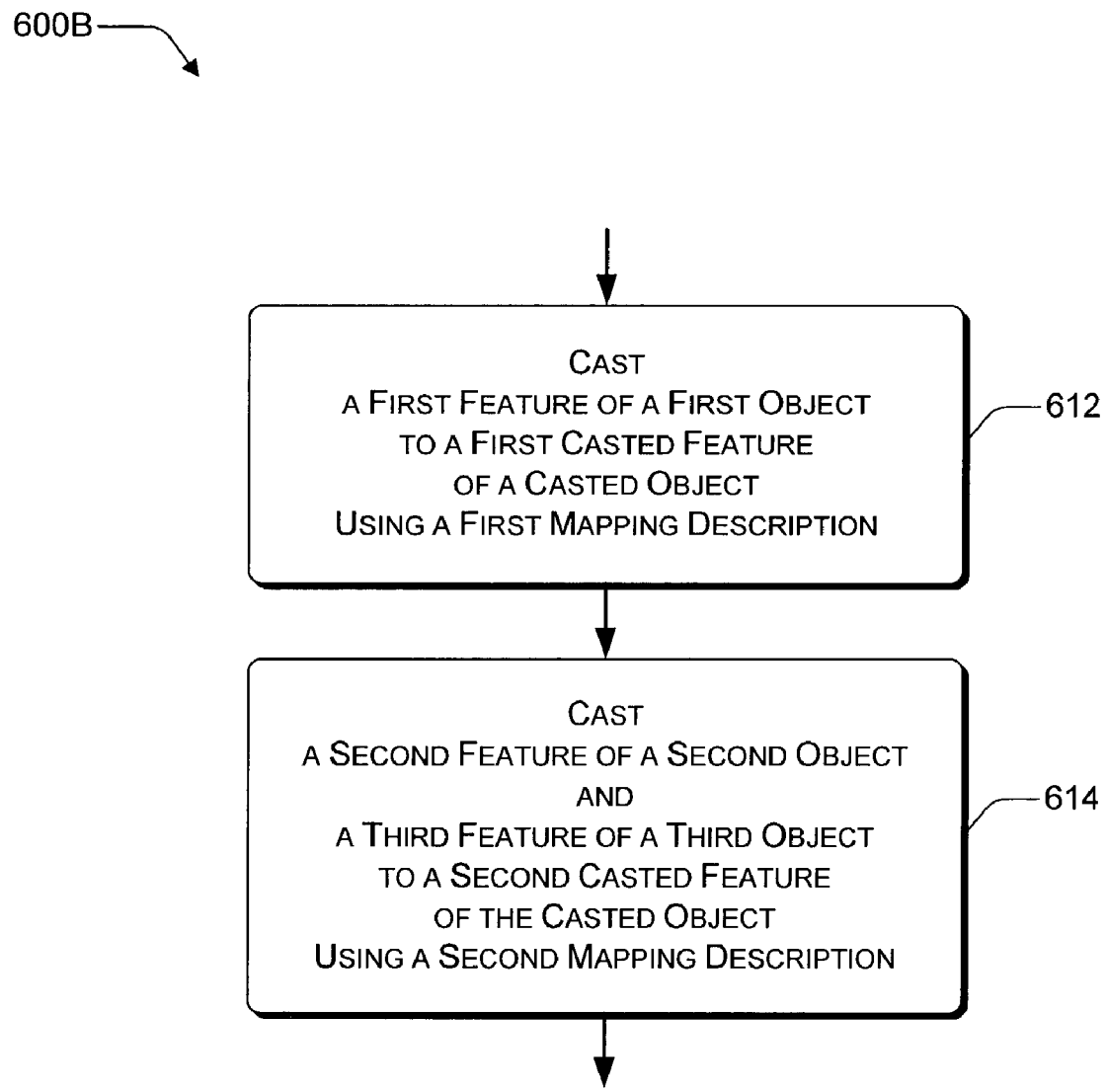

FIG. 6B is a flow diagram 600B that illustrates a fourth exemplary method for runtime polymorphism. Flow diagram 600B includes two (2) blocks 612 and 614. At block 612, a first feature of a first object is cast to a first casted feature of a casted object using a first mapping description. For example, a feature 102F1 (of FIG. 5B) of an object #1 102(1) may be cast to a casted feature 104F1 of a casted object 104.

At block 614, a second feature of a second object and a third feature of a third object are cast to a second casted feature of the casted object using a second mapping description. For example, a feature 102F2 of an object #2 102(2) and a feature 102Fn of an object #n 102(n) may be casted to a casted feature 104F2 of casted object 104. The first and second (feature) mapping descriptions may be from the same runtime casting description, such as runtime casting description 302. The actions of block 614 may alternatively exclude the third feature of the third object such that the second mapping description is not a function thereof (and optionally not a function-type mapping description).

Figure 7:
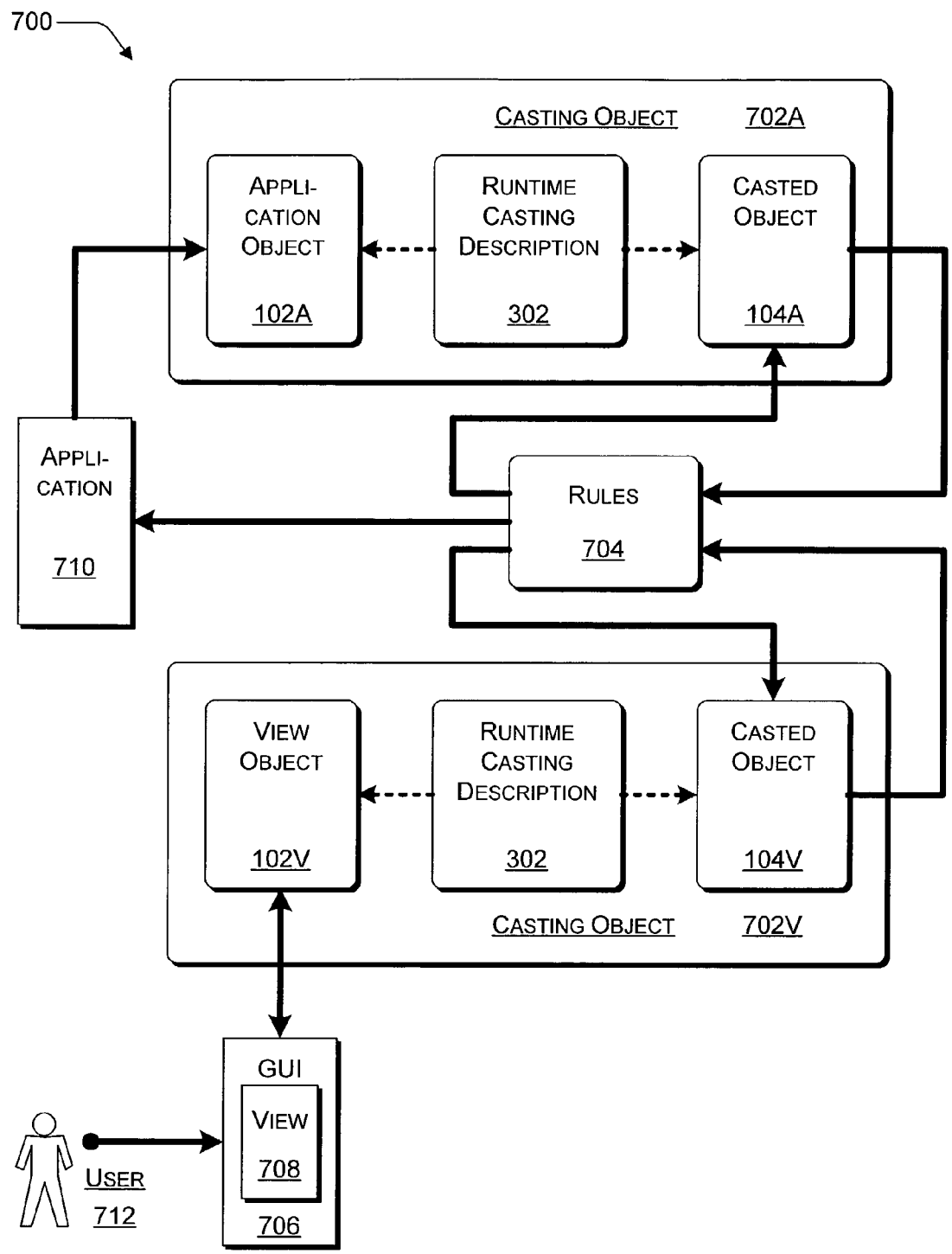
FIG. 7 is a block diagram that illustrates a fifth exemplary approach to runtime polymorphism.

FIG. 7 is a block diagram 700 that illustrates a fifth exemplary approach to runtime polymorphism. Block diagram 700 includes two casting objects 702V and 702A, rules 704, a graphical user interface (GUI) block 706, a view block 708 that is presented via GUI block 706, an application 710, and a user 712. Casting object 702V includes a view object 102V, a runtime casting description 302, and a casted object 104V. View object 102V includes view-oriented file-related information. Casting object 702A includes an application object 102A, the runtime casting description 302, and a casted object 104A. Application object 102A includes application-oriented file-related information.

In a described implementation, casting objects 702V and 702A serve as enhanced objects that represent an object programmatically. This programmatic object representation can provide the larger system and/or environment with information about itself, such as the set of properties and methods that the enhanced object exposes. At runtime, an enhanced object uses a runtime casting description to apply the correct mappings to perform polymorphic feature-level casting operations between a source object and a destination object.

Such an enhanced object is capable of implementing the features of the destination object, and it may include the source object by keeping an internal reference thereto. The enhanced object uses the runtime casting description to create runtime bindings that effectively perform the feature casting operations as defined therein. There may be one kind of binding for each kind of feature casting operation. The feature casting operations themselves may be evaluated opportunistically inside each binding. For instance, in a one-to-one property mapping, the source property value can be updated when the destination property value is updated and vice versa. The updating may optionally be handled by the enhanced object.

As illustrated in block diagram 700 for a described implementation, casting object 702V creates casted object 104V from view object 102V in a casting operation that uses runtime casting description 302. Casting object 702V is capable of maintaining the bindings between view object 102V and casted object 104V by monitoring changes to either object and by responsively performing updates, possibly in accordance with individual feature casting operations therebetween.

Similarly, casting object 702A creates casted object 104A from application object 102A in a casting operation that uses runtime casting description 302. Casting object 702A is capable of maintaining the bindings between application object 102A and casted object 104A by monitoring changes to either object and by responsively performing updates, possibly in accordance with individual feature casting operations therebetween.

Although not so illustrated, runtime casting descriptions 302 for either or both of casting objects 702V and 702A may be merely associated therewith and not necessarily included as part thereof. Additionally, casting objects 702V and 702A may share a runtime casting description 302. It should also be noted that, for example, view object 102V may be created from casted object 104V using runtime casting description 302 to aid in maintaining consistency between an application object 102A and a view object 102V.

Casted object 104V and casted object 104A may be of the same type when created using the same (e.g., identical or substantially similar) runtime casting descriptions 302. In fact, using the same runtime casting description 302 ensures increased certainty and equivalency with respect to the constituency of casted objects 104V and 104A. The resulting predictability as to the feature set of casted objects 104V and 104A facilitates formulation and subsequent application of rules 704.

In other words, rules 704 can be more efficient in terms of code size and operational complexity inasmuch as (i) no error checking need be performed and (ii) the feature set of the casted objects to which the rules are to be run against is guaranteed as a result of their being casted using a runtime casting description 302. For example, there need be no accommodation in rules 704 for surprises or discoveries during runtime with respect to the constituency of casted objects 104V and 104A, for this can effectively be guaranteed.

In operation, casting objects 702V and 702A and rules 704 serve to maintain consistency between view object 102V and application object 102A as they are changed by view block 708/GUI 706 and application 710, respectively. When application 710 makes a change to application object 102A, casting object 702A propagates the change to casted object 104A via the bindings between application object 102A and casted object 104A. When rules 704 are run against casted object 104A, a change to casted object 104A is detected. Rules 704 propagate this change to casted object 104V.

The propagation of the change in casted object 104A to casted object 104V via rules 704 is facilitated by the certainty of the equivalency of their feature sets. Casting object 702V propagates the change in casted object 104V to view object 102V via the bindings therebetween. GUI 706, with respect to view 708, can reflect changes in view object 102V in a manner that is apparent to user 712.

The process of/scheme for maintaining consistency between view object 102V and application object 102A may also be performed in the inverse direction. Hence, if user 712 makes changes to view object 102V via view 708/GUI 706, such changes may be propagated to application object 102A by way of casted object 104V, rules 704, casted object 104A, and so forth. It should be noted that the process of maintaining consistency between view object 102V and application object 102A may also be achieved without using the programmatic object representations of casting objects 702V and 702A.

Figure 8:
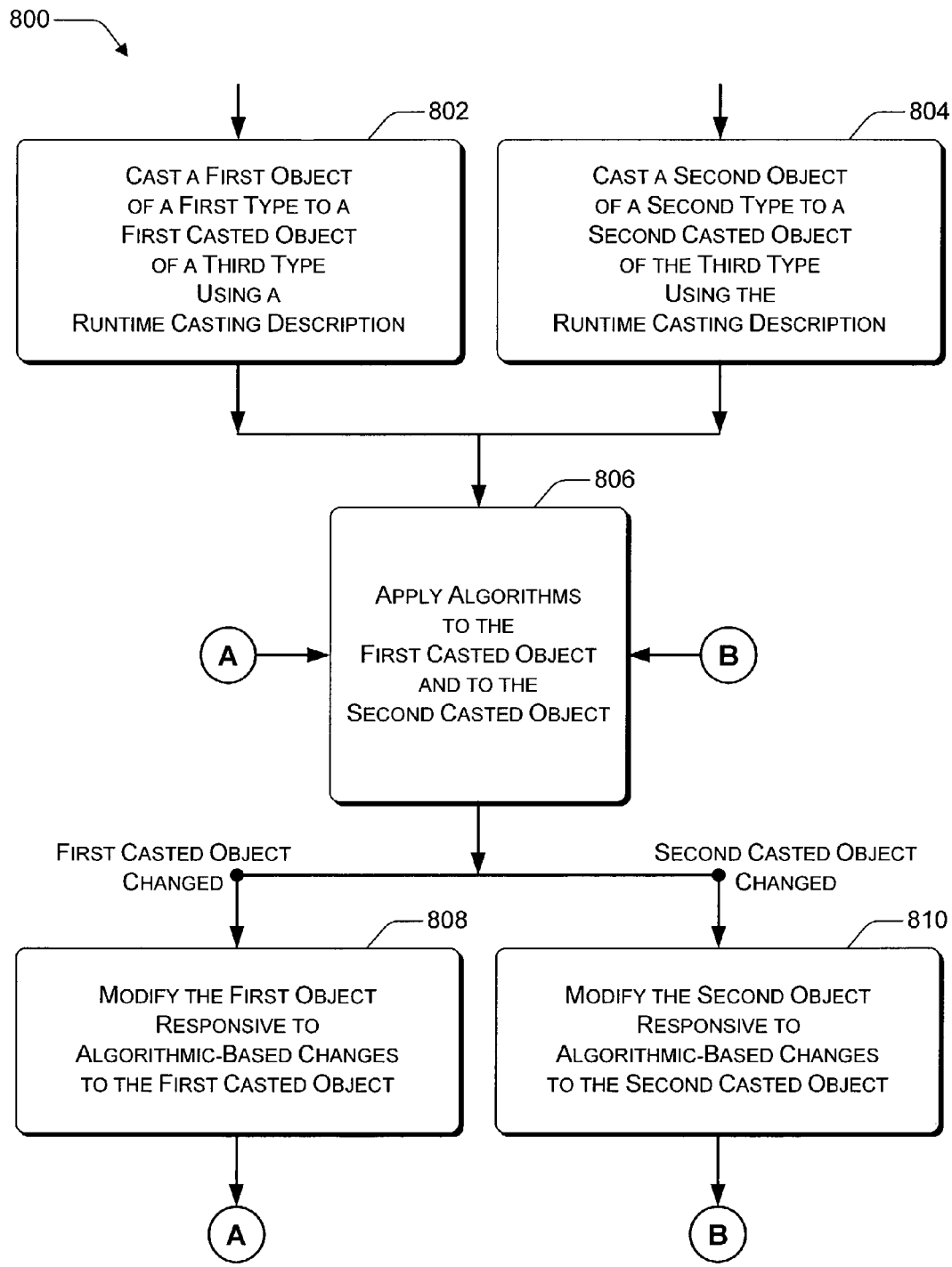
FIG. 8 is a flow diagram that illustrates a fifth exemplary method for runtime polymorphism.

FIG. 8 is a flow diagram 800 that illustrates a fifth exemplary method for runtime polymorphism. Flow diagram 800 includes five (5) blocks 802-810. While block diagram 700 (of FIG. 7) illustrates at least part of an exemplary approach to managing objects, flow diagram 800 illustrates at least part of an exemplary method for managing objects.

At block 802, a first object of a first type is cast to a first casted object of a third type using a runtime casting description. For example, an application object 102A (of FIG. 7) may be cast to a casted object 104A using a runtime casting description 302. The type of casted object 104A is determined by runtime casting description 302. This casting may optionally be part of an enhanced object such as a casting object 702A.

At block 804, a second object of a second type is cast to a second casted object of the third type using the runtime casting description. For example, a view object 102V may be cast to a casted object 104V, or vice versa, using runtime casting description 302. The type of casted object 104V is also determined by runtime casting description 302 and is the same as the type of casted object 104A in this described implementation. This casting may optionally be part of an enhanced object such as a casting object 702V.

At block 806, algorithms are applied to the first casted object and to the second casted object. For example, rules 704, which are an example of such algorithms, may be run against casted object 104A and casted object 104V to monitor them and detect any changes thereto. Further, rules 704 may be used to propagate a change detected in casted object 104A to casted object 104V and vice versa.

If the first casted object is changed by application of one or more algorithms (e.g., because the algorithms propagated a change that was detected in the second casted object to the first casted object), then at block 808 the first object is modified responsive to the algorithmic-based changes to the first casted object. For example, a change to casted object 104A made by running rules 704 thereon may be propagated to application object 102A by way of bindings between application object 102A and casted object 104A as established in accordance with runtime casting description 302.

Similarly, if the second casted object is changed by application of one or more algorithms (e.g., because the algorithms propagated a change that was detected in the first casted object to the second casted object), then at block 810 the second object is modified responsive to the algorithmic-based changes to the second casted object. For example, a change to casted object 104V made by running rules 704 thereon may be propagated to view object 102V by way of bindings between view object 102V and casted object 104V as established in accordance with runtime casting description 302. As indicated by the encircled "A"s and "B"s, after the action(s) of either of blocks 808 and 810 have been performed, flow can continue at block 806 to continue applying the algorithms.

The approaches and methods of FIGS. 1-8 are illustrated in diagrams that are divided into multiple blocks. However, the order and/or layout in which the approaches and methods are described and/or shown is not intended to be construed as a limitation, and any number of the blocks can be combined, augmented, eliminated, and/or re-arranged in any order to implement one or more systems, methods, media, apparatuses, arrangements, etc. for runtime polymorphism. Furthermore, although the description herein includes references to specific implementations such as that of FIGS. 5A, 5B, and 7 (as well as the exemplary system environment of FIG. 9), the approaches and methods can be implemented in any suitable hardware, software, firmware, or combination thereof and using any suitable data-modeling, programming language, coding mechanisms, and so forth.

Figure 9:
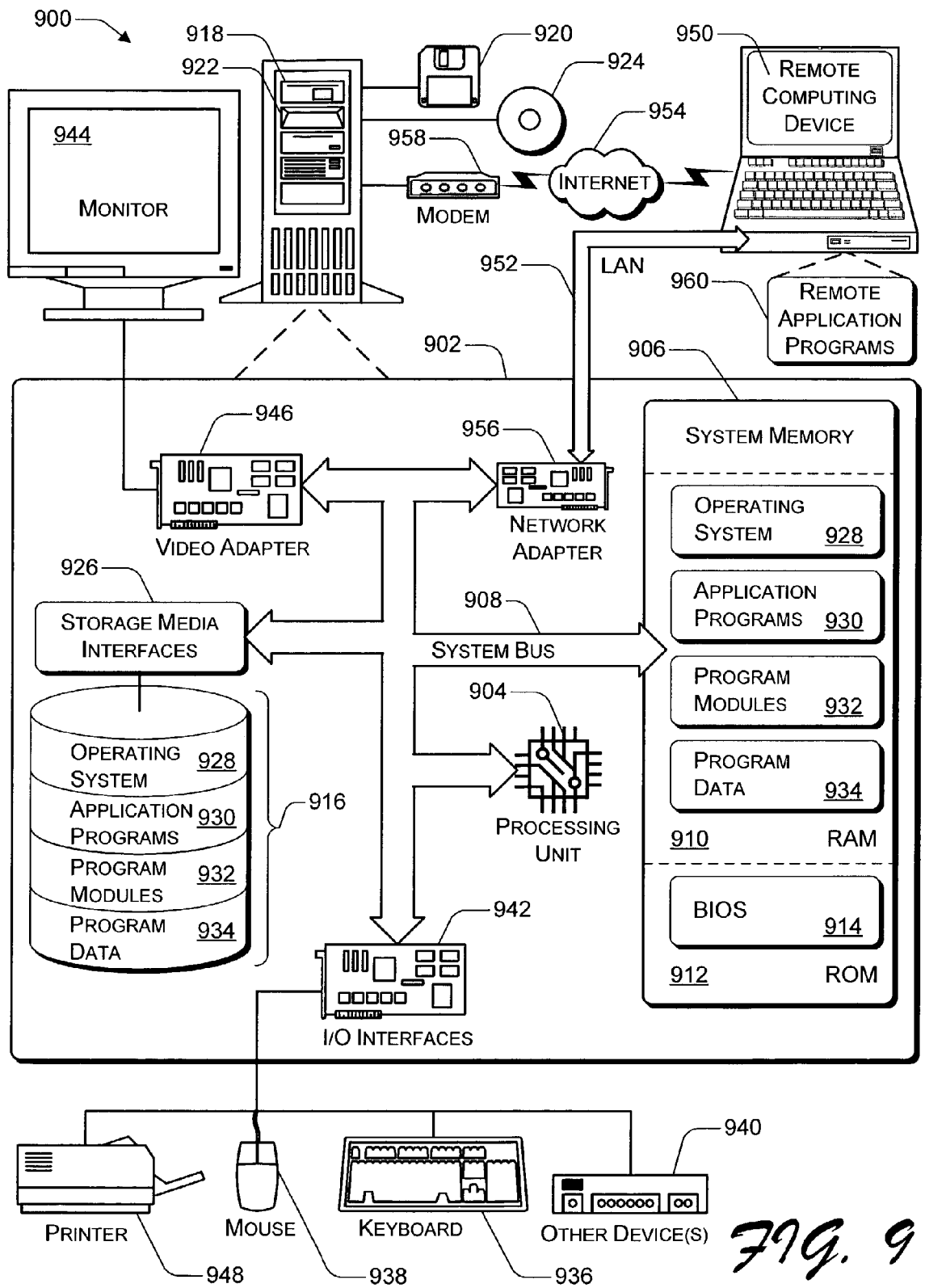
FIG. 9 illustrates an exemplary computing operating environment (or general computing device) that is capable of (wholly or partially) implementing at least one aspect of runtime polymorphism as described herein.

FIG. 9 illustrates an exemplary computing operating environment 900 (or general computing device) that is capable of (fully or partially) implementing at least one system, device, media, component, approach, method, process, some combination thereof, etc. for runtime polymorphism as described herein. Computing environment 900 may be utilized in the computer and network architectures described below or in a stand-alone situation.

Exemplary computing device operating environment 900 is only one example of an environment and is not intended to suggest any limitation as to the scope of use or functionality of the applicable computing device architectures (including those of computers, consumer electronics, game consoles, set-top boxes, mobile appliances, etc.). Furthermore, computing device environment 900 is not to be interpreted as having any dependency or requirement relating to any one or any combination of components as illustrated in FIG. 9. Moreover, the applicable computing devices are not limited by the processors/processing mechanisms employed therein. For example, such processors/processing mechanisms may include, but are not limited to, electronic integrated circuits (ICs), quantum computing, optical computing, mechanical computing (e.g., using nano technology), and so forth.

Additionally, runtime polymorphism may be implemented with numerous other general purpose or special purpose computing device (including electronic) environments or configurations. Examples of well known computing (device) systems, environments, and/or configurations that may be suitable for use include, but are not limited to, personal computers, server computers, thin clients, thick clients, personal digital assistants (PDAs) or mobile telephones, hand-held or laptop devices, multiprocessor systems, microprocessor-based systems, set top boxes, programmable consumer electronics, video game machines, game consoles, portable or handheld gaming units, network PCs, minicomputers, mainframe computers, distributed computing environments that include any of the above systems or devices, some combination thereof, and so forth.

Implementations for runtime polymorphism may be described in the general context of processor-executable instructions. Generally, processor-executable instructions include routines, programs, objects, components, data structures, other code, etc. that perform particular tasks or implement particular abstract data types. Polymorphic object casting in a runtime environment, as described in certain implementations herein, may also be practiced in distributed computing environments where tasks are performed by remotely-linked processing devices that are connected through a communications link and/or network. Especially in a distributed computing environment, processor-executable instructions may be located in separate storage media, executed by different processors, and/or extant on or propagated over transmission media.

Computing device environment 900 includes a general-purpose computing device in the form of a computer 902, which may comprise any computing device with computing and/or processing capabilities. The components of computer 902 may include, but are not limited to, one or more processors or processing units 904, a system memory 906, and a system bus 908 that couples various system components including processor 904 to system memory 906.

System bus 908 represents one or more of any of several types of wired or wireless bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 902 typically includes a variety of processor-accessible media. Such media may be any available media that is accessible by computer 902 or another computing device, and it includes both volatile and non-volatile media, removable and non-removable media, and storage and transmission media.

System memory 906 includes processor-accessible storage media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is typically stored in ROM 912. RAM 910 typically contains data and/or program modules/instructions that are immediately accessible to and/or being presently operated on by processing unit 904.

Computer 902 may also include other removable/non-removable and/or volatile/non-volatile storage media. By way of example, FIG. 9 illustrates a hard disk drive or disk drive array 916 for reading from and writing to a (typically) non-removable, non-volatile magnetic media (not separately shown); a magnetic disk drive 918 for reading from and writing to a (typically) removable, non-volatile magnetic disk 920 (e.g., a "floppy disk"); and an optical disk drive 922 for reading from and/or writing to a (typically) removable, non-volatile optical disk 924 such as a CD-ROM, DVD-ROM, or other optical media. Hard disk drive 916, magnetic disk drive 918, and optical disk drive 922 are each connected to system bus 908 by one or more storage media interfaces 926. Alternatively, hard disk drive 916, magnetic disk drive 918, and optical disk drive 922 may be connected to system bus 908 by one or more other separate or combined interfaces (not shown).

The disk drives and their associated processor-accessible media provide non-volatile storage of processor-executable instructions, such as data structures, program modules, and other data for computer 902. Although exemplary computer 902 illustrates a hard disk 916, a removable magnetic disk 920, and a removable optical disk 924, it is to be appreciated that other types of processor-accessible media may store instructions that are accessible by a computing device, such as magnetic cassettes or other magnetic storage devices, flash memory, CD-ROM, digital versatile disks (DVD) or other optical storage, RAM, ROM, electrically-erasable programmable read-only memories (EEPROM), and so forth. Such media may also include so-called special purpose or hard-wired integrated circuit (IC) chips. In other words, any processor-accessible media may be utilized to realize the storage media of the exemplary computing system and environment 900.

Any number of program modules (or other units or sets of processor-executable instructions) may be stored on hard disk 916, magnetic disk 920, optical disk 924, ROM 912, and/or RAM 910, including by way of general example, an operating system 928, one or more application programs 930, other program modules 932, and program data 934. By way of specific example but not limitation, objects 102, casted objects 104, runtime casting descriptions 302, applications 504/710, service libraries 502, casting objects 702, rules 704, etc. (of FIGS. 1, 3, 5A, 5B, and 7) may be part of any one or more of such program modules 928, 930, 932, and 934.

A user 712 (of FIG. 7) that is modifying a view object 102V via a GUI 706, for example, may enter commands and/or information into computer 902 via input devices such as a keyboard 936 and a pointing device 938 (e.g., a "mouse"). Other input devices 940 (not shown specifically) may include a microphone, joystick, game pad, satellite dish, serial port, scanner, and/or the like. These and other input devices are connected to processing unit 904 via input/output interfaces 942 that are coupled to system bus 908. However, they may instead be connected by other interface and bus structures, such as a parallel port, a game port, a universal serial bus (USB) port, an IEEE 1394 ("Firewire") interface, an IEEE 802.11 wireless interface, a Bluetooth® wireless interface, and so forth.

A monitor/view screen 944 or other type of display device may also be connected to system bus 908 via an interface, such as a video adapter 946. Video adapter 946 (or another component) may be or may include a graphics card for processing graphics-intensive calculations and for handling demanding display requirements. Typically, a graphics card includes a graphics processing unit (GPU), video RAM (VRAM), etc. to facilitate the expeditious performance of graphics operations. In addition to monitor 944, other output peripheral devices may include components such as speakers (not shown) and a printer 948, which may be connected to computer 902 via input/output interfaces 942.

Computer 902 may operate in a networked environment using logical connections to one or more remote computers, such as a remote computing device 950. By way of example, remote computing device 950 may be a personal computer, a portable computer (e.g., laptop computer, tablet computer, PDA, mobile station, etc.), a palm or pocket-sized computer, a gaming device, a server, a router, a network computer, a peer device, other common network node, or another common computer type as listed above, and so forth. However, remote computing device 950 is illustrated as a portable computer that may include many or all of the elements and features described herein with respect to computer 902.

Logical connections between computer 902 and remote computer 950 are depicted as a local area network (LAN) 952 and a general wide area network (WAN) 954. Such networking environments are commonplace in offices, enterprise-wide computer networks, intranets, the Internet, fixed and mobile telephone networks, other wireless networks, gaming networks, some combination thereof, and so forth.

When implemented in a LAN networking environment, computer 902 is usually connected to LAN 952 via a network interface or adapter 956. When implemented in a WAN networking environment, computer 902 typically includes a modem 958 or other means for establishing communications over WAN 954. Modem 958, which may be internal or external to computer 902, may be connected to system bus 908 via input/output interfaces 942 or any other appropriate scheme(s). It is to be appreciated that the illustrated network connections are exemplary and that other means of establishing communication link(s) between computers 902 and 950 may be employed.

In a networked environment, such as that illustrated with computing device environment 900, program modules or other instructions that are depicted relative to computer 902, or portions thereof, may be fully or partially stored in a remote memory storage device. By way of example, remote application programs 960 reside on a memory component of remote computer 950 but may be usable or otherwise accessible via computer 902. Also, for purposes of illustration, application programs 930 and other processor-executable instructions such as operating system 928 are illustrated herein as discrete blocks, but it is recognized that such programs, components, and other instructions reside at various times in different storage components of computing device 902 (and/or remote computing device 950) and are executed by data processor(s) 904 of computer 902 (and/or those of remote computing device 950).

As noted above, traditional polymorphism models are solely based on type and entail having polymorphism being defined at compile time. Both source type information and destination type information are also fully defined at compile time. Furthermore, in traditional polymorphism a specific type is polymorphed to another specific type, which entails having a unique destination type for each unique source type (one-to-one casting).

On the other hand, certain implementations as described herein provide a polymorphism paradigm that enables objects of arbitrary types to be cast using an enhanced polymorphism scheme into a new type at runtime using a metadata description of the process. In certain described implementations, the enhanced polymorphism paradigm involves one or more of: (i) polymorphism extension by including features of source; (ii) polymorphism definition(s) with metadata, which is interpreted at runtime; (iii) source type independence, where source type information may be discovered at runtime; (iv) many-to-one casting for polymorphing arbitrary source types to a destination type with the same runtime casting definition being used for any source type; and (v) runtime adaptivity, in which a destination type is cast regardless of the source type that is discovered at runtime.

Although systems, media, methods, approaches, processes, arrangements, apparatuses, devices, and other implementations have been described in language specific to component, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more processor-accessible storage media comprising processor-executable instructions that, when executed by a processor, direct a computing device to perform actions comprising:

retrieving one or more mapping descriptions from a runtime casting description, the one or more mapping descriptions defining feature-level mappings to create a casted object including casted features from a source object including source features independent of type information of the source object, wherein the features from the source object comprise a method feature or a property feature;

casting a first object of a first type and a second object of a second type to a first casted object of a third type and to a second casted object of the third type, wherein the first type and the second type are different from the third type, wherein casting the first object of the first type to the first casted object of the third type includes casting a subset of features of the first object of the first type to the first casted object of the third type using the retrieved mapping descriptions from the runtime casting description, wherein the at least one of the features of the first casted object of the first type has a functionality different than a corresponding casted feature of the first casted object of the third type;

wherein casting a second object of the second type to the second casted object of the third type includes casting a subset of features of the second object of the second type to the second casted object of the third type using the retrieved mapping descriptions from the runtime casting description;

applying one or more algorithms to the first casted object of the third type and to the second casted object of the third type;

detecting a change in the second casted object;

propagating the change to the first casted object; and modifying the first object responsive to the change propagated to the first casted object in the propagating action.

2. The one or more processor-accessible storage media as recited in claim 1, comprising the processor-executable instructions that, when executed, direct the computing device to perform further actions comprising:

accepting a change in the second object; and propagating the change in the second object to the second casted object as the change detected in the second casted object in the action of detecting.

3. The one or more processor-accessible storage media as recited in claim 2, wherein the processor-executable instructions include:

a first casting object that performs the actions of:

casting a first object; and modifying the first object;

a second casting object that performs the actions of:

casting a second object;

accepting a change; and propagating the change in the second object;

algorithmic coding that performs the action of:

applying one or more algorithms;

detecting a change; and propagating the change to the first casted object.

4. A computing device having storage media, the storage media comprising:

metadata comprises a runtime casting description that defines runtime polymorphism with feature-level mappings that is capable of being interpreted to cast object to casted objects;

a first object;

a second object;

a first casted object created from casting a subset of features of the first object and including a new feature different than features included in the first object, the first casted object created by using the metadata, the features of the first object comprising a method or a property feature, wherein the first object and the first casted object together comprise a programmatic object representation, the programmatic object representation comprises an enhanced casted object;

a second casted object created from casting at least one feature of the second object using the metadata; and algorithmic code that is adapted to manage the first object and the second object via the first casted object and the second casted object, wherein the algorithmic code comprises one or more rules that are run against the first casted object and against the second casted object to detect changes in one casted object and to propagate the detected changes to the other casted object.

5. The computing device as recited in claim 4, wherein the first object comprises an application object, the second object comprises a view object, and the algorithmic code comprises one or more rules that, at least partially, maintain consistency between the application object and the view object.

6. A method implemented on a computing device by a processor configured to execute instructions that, when executed by the processor, direct the computing device to perform acts comprising:

retrieving at least one mapping description from a runtime casting description, the at least one mapping description defining a feature-level mapping for creation of a casted object;

creating the casted object from a source object including source features by implementing feature casting operations in accordance with the at least one mapping description;

wherein implementing comprises:

mapping a feature from the source object to the casted object in accordance with the at least one mapping description, wherein the mapping declares that at least one feature of the casted object is to have a functionality differing from a corresponding feature of the object, filtering at least one method of the source object in accordance with the at least one mapping description, mapping one or more predetermined features of the source object to at least one casted feature for the casted object in accordance with the at least one mapping description, including a new feature different than features included in the source object to the casted object, and wherein the at least one mapping description defines a mapping from a property feature of the source object to a method feature of the casted object, a mapping from a method feature of the object to a property feature of the casted object.

7. One or more processor-accessible storage media comprising processor-executable instructions that, when executed, direct a computing device to perform actions comprising:

casting a plurality of source objects of different types into a single object of a casted type based on a runtime casting description, wherein each of the plurality of source objects includes a plurality of features, the plurality of features comprising at least one method feature and at least one property feature, wherein the plurality of source objects comprise at least a first source object of a first type and a second source object of a second type, the first type and the second type being different, and wherein the casting comprises:

for each of the plurality of source objects, casting at least one feature thereof into the single object based on the runtime casting description;

casting a first feature of the first source object into a first casted feature of the single object;

casting a second feature of the second source object into a second casted feature of the single object;

casting a feature of the first source object and a feature of the second source object into a casted feature of the single object.

8. One or more processor-accessible storage media comprising processor-executable instructions that, when executed, direct a computing device to perform actions comprising:

casting a plurality of source objects to one or more casted objects of a casted type regardless of types of the plurality of source objects, wherein:

the casting is based on respective features and independent of a respective type of each of the plurality source objects, the respective features comprising a method feature and a property feature, the plurality of source objects comprise a first object of a first type and a second object of a second type, the one or more casted objects comprise a first casted object of the casted type and a second casted object of the casted type, the first type and the second type are different from the casted type, a subset including fewer than all of the features of the first object of the first type are casted to the first casted object of the casted type using a runtime casting description, a subset including fewer than all of the features of the second object of the second type are casted to the second casted object of the casted type using the runtime casting description; and the runtime casting description comprises casting operations comprising:

a casting operation from a first source feature of a source object of the plurality of source objects to a casted feature of a casted object of the one or more casted objects, a casting operation from a second source feature of the source object of the plurality of source objects to nothing in the casted object of the one or more casted objects, a casting operation from multiple source features of the source object of the plurality of source objects to a single feature of the casted object of the one or more casted objects, and a casting operation enabling a new feature to be defined in the casted object of the one or more casted objects that is different than a feature or a function of features of the source object of the plurality of source objects.

9. The one or more processor-accessible storage media as recited in claim 8, wherein the first casted object and the second casted object are the same.

10. The one or more processor-accessible storage media as recited in claim 8, wherein the runtime casting description further defines a mapping from a property feature of the source object of the plurality of source objects to a method feature of the casted object of the one or more casted objects.

* * * * *